United States Patent
Chauvel et al.

(10) Patent No.: US 8,861,700 B2
(45) Date of Patent: Oct. 14, 2014

(54) METHOD FOR NOTIFYING COMMUNICATION IN PROGRESS TO TERMINALS CONNECTED TO A DOMESTIC GATEWAY

(75) Inventors: Jérôme Chauvel, Trevou Treguignec (FR); Nelly Trovel, Trebeurden (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 13/395,695

(22) PCT Filed: Sep. 14, 2010

(86) PCT No.: PCT/FR2010/051907
§ 371 (c)(1),
(2), (4) Date: Mar. 13, 2012

(87) PCT Pub. No.: WO2011/033216
PCT Pub. Date: Mar. 24, 2011

(65) Prior Publication Data
US 2012/0170733 A1    Jul. 5, 2012

(30) Foreign Application Priority Data
Sep. 15, 2009 (FR) .................................. 09 56321

(51) Int. Cl.
H04M 1/00    (2006.01)
H04M 1/82    (2006.01)
H04M 7/12    (2006.01)
H04M 1/723    (2006.01)
H04M 7/00    (2006.01)
H04M 1/253    (2006.01)
H04M 1/57    (2006.01)
H04M 3/42    (2006.01)

(52) U.S. Cl.
CPC ................ H04M 7/125 (2013.01); H04M 1/82 (2013.01); *H04M 7/0069* (2013.01); *H04M 1/2535* (2013.01); H04M 1/723 (2013.01); *H04M 1/573* (2013.01); *H04M 3/42365* (2013.01)
USPC .......................................... 379/164; 370/352

(58) Field of Classification Search
USPC .................. 379/142.1, 156, 164; 370/352
See application file for complete search history.

(56) References Cited

U.S. PATENT DOCUMENTS

| | | | |
|---|---|---|---|
| 6,477,248 B1 * | 11/2002 | Bruhnke et al. | 379/399.01 |
| 7,336,668 B2 * | 2/2008 | Adams | 370/396 |
| 7,941,762 B1 * | 5/2011 | Tovino et al. | 715/816 |
| 2003/0035523 A1 * | 2/2003 | Mansfield | 379/93.07 |
| 2007/0086446 A1 * | 4/2007 | Denny et al. | 370/356 |

FOREIGN PATENT DOCUMENTS

| | | |
|---|---|---|
| WO | WO 00/04683 A1 | 1/2000 |
| WO | WO 03/009529 A2 | 1/2003 |
| WO | WO 2008/074119 A1 | 6/2008 |

* cited by examiner

*Primary Examiner* — Quoc D Tran
(74) *Attorney, Agent, or Firm* — Drinker Biddle & Reath LLP (57) ABSTRACT

A method for notifying a call involving a terminal connected to a domestic gateway, the setting up of the call involving the passage of a signaling flow through the domestic gateway, the method comprising a step of receiving a message signaling acceptance of the call, comprising the steps of: determining at least one terminal connected to the domestic gateway and not being involved in the call, and sending a call-in-progress notification message to the at least one terminal.

10 Claims, 4 Drawing Sheets

METHOD FOR NOTIFYING COMMUNICATION IN PROGRESS TO TERMINALS CONNECTED TO A DOMESTIC GATEWAY

CROSS-REFERENCE TO RELATED APPLICATIONS

This application is the U.S. national phase of the International Patent Application No. PCT/FR2010/051907 filed Sep. 14, 2010, which claims the benefit of French Application No. 09 56321 filed Sep. 15, 2009, the entire content of which is incorporated herein by reference.

FIELD

The present invention relates generally to the field of telecommunications.

BACKGROUND

More specifically, the invention relates to a method for notifying, to a telephone terminal, placed behind an access gateway to a telecommunication network such as a voice-over-IP network (IP standing for Internet Protocol), the fact that a communication is in progress on another telephone terminal connected to this gateway.

With the growing development of voice-over-IP services, such gateways, also called domestic gateways, are now known, behind which it is possible to connect a plurality of terminals to distinct ports, in order to benefit from various services, such as Internet access, television over IP, voice over IP, etc.

In the context of the invention, only telephone terminals connected to such a gateway are considered. For the purposes of clarity and concision, the terminals mentioned hereinafter in this application are therefore, unless otherwise specified, telephone terminals.

The telephone terminals connected behind such a domestic gateway are generally associated with a same public telephone identifier or number on the voice-over-IP network (for example, an SIP address) to which the gateway is connected. In such a case, the gateway is called single-line. Otherwise, if the domestic gateway is associated with a number of public identifiers, the gateway is called multiple-line.

Now, most of the domestic gateways are single-line, and generally operate in single-communication mode: a single simultaneous telephone communication between an external terminal and one of the terminals connected to the gateway can be set up. When such a communication is in progress, it is therefore not possible to initiate a telephone call from another terminal connected to the gateway, not involved in this communication. As it happens, there is no visual indication enabling the user of this other terminal to know that the line is busy, only the busy tone played to the user on lifting the handset providing this information.

Furthermore, the same problem arises for the domestic gateways that operate in multi-communication mode, that is to say, which enable a number of telephone communications to be set up simultaneously, when the number of telephone terminals connected to such a gateway exceeds the number of communications that can be managed simultaneously by this gateway.

SUMMARY

One of the aims of the invention is to remedy at least some of the drawbacks of the prior art by providing a call notification method, a domestic gateway and a telephone terminal enabling information concerning the availability of the telephone line or lines managed by the domestic gateway to be displayed on this terminal.

To this end, the invention proposes a method for notifying a call involving a terminal connected to a domestic gateway, the setting up of said call involving the passage of a signaling flow through said domestic gateway, said method comprising a step of receiving a message signaling acceptance of said call, characterized in that it comprises the steps of:
 determining at least one terminal connected to said domestic gateway and not being involved in said call,
 sending a call-in-progress notification message to said at least one terminal.

When the domestic gateway is multiple-communication, the determination and sending steps are possibly repeated when other calls are set up while said call is still in progress.

Thus, by virtue of the invention, a user of a terminal connected to the domestic gateway can know the extent to which the telephone line or lines managed by the domestic gateway is/are busy.

Preferentially, said notification message is sent by the gateway to all the telephone terminals connected to this gateway, except for the terminal involved in said call. In this way, at each instant, all the terminals located behind the gateway have the same information regarding the call or calls managed by the gateway.

The invention is simple to implement. It requires only a few modifications on the existing equipment (domestic gateway and terminals), since it is based advantageously on the domestic gateway, which, by its function, already has the contexts of the calls which are sent or received via it. In particular, the invention requires no interfacing with a presence server, a solution that would be complex to implement, and would require numerous interchanges between the terminals connected to the gateway and the presence server in order to update their presence information on said presence server, even though such presence information is not directly linked to the availability of the domestic gateway to send or receive a call.

According to a first variant embodiment of the invention, said sending step is followed by a step of receiving a message signaling the end of said call, and a step of sending an end-of-call notification message to said at least one terminal.

In this variant, the message notifying a call in progress will be followed by a message notifying the end of this call in progress, sent by the domestic gateway when the call in progress terminates. A telephone terminal receiving these notification messages therefore itself manages the count of the calls in progress, incrementing it when it receives a message notifying a call in progress, and decrementing it when it receives a message notifying the end of a call in progress.

According to a second variant embodiment of the invention, said sending step is followed by a step of receiving a message signaling the end of said call, and a step of sending a new call-in-progress notification message, said call-in-progress notification messages indicating the total number of calls in progress passing through said gateway to said at least one terminal.

In this second variant, the domestic gateway itself counts the number of calls in progress and informs the terminals when this number changes. In this variant, the domestic gateway sends, if appropriate, the notification messages indicating the number of calls in progress to all the terminals connected to the domestic gateway, including those involved in a telephone call.

Advantageously, said call-in-progress notification message indicates one or more terminal or user identities involved in said call or calls in progress.

This additional information inserted into the notification messages sent by the domestic gateway adds to the availability information supplied to the terminals receiving these messages. In practice, the identity of one of the terminals or users involved in a call in progress often implies a certain communication duration, and therefore a certain duration of unavailability of the gateway for another communication for example if the gateway is in single-communication mode.

It should also be noted that, since the notification messages are sent by the gateway upon the detection of a transition to a connected or disconnected state of a call for one of the terminals, the invention does not require any additional memory resources on the gateway.

It will also be noted that the invention advantageously minimizes the exchange of messages between the gateway and the terminals. This is because a message is sent by the gateway only upon the detection of a change of state of a call (transition to the connected or disconnected state). Thus, the invention does not require any periodic scanning of the gateway by the terminals to be informed of the availability of the gateway to send or receive a call. Since the invention relies on a one-way link between the gateway and the terminals, the resources of the gateway are preserved and the invention does not generate any unnecessary traffic between the gateway and the terminals.

Correlatively, the invention also targets a domestic gateway comprising means for connecting to a communication network, means for connecting to a plurality of communication devices, and means for receiving a message signaling acceptance of a call involving a device of said plurality of devices, said call involving the passage of a signaling flow in said domestic gateway, characterized in that it also comprises:
  means for determining at least one device connected to said domestic gateway and not being involved in said call,
  and means for sending a call-in-progress notification message to said at least one device.

According to the second variant embodiment of the invention, said domestic gateway also comprises means for counting a number of calls in progress.

The invention also targets a telephone terminal, characterized in that it comprises:
  means for receiving a notification message sent according to the notification method according to the invention,
  and means for displaying information indicating that one or more calls are in progress.

According to the first variant embodiment of the invention, said terminal also comprises:
  means for incrementing a counter of a number of calls in progress on reception of a message notifying a call in progress,
  means for decrementing said counter on reception of a message notifying the end of a call,
  and means for displaying information indicating said number of calls in progress.

The invention finally targets a computer program comprising instructions for implementing the notification method according to the invention, when it is run on a computer.

The domestic gateway, the telephone terminal and the computer program according to the invention offer advantages similar to those of the notification method according to the invention.

BRIEF DESCRIPTION OF THE DRAWINGS

Other features and advantages will become apparent upon reading about a preferred embodiment described with reference to the figures in which.

DETAILED DESCRIPTION

Figure 1:
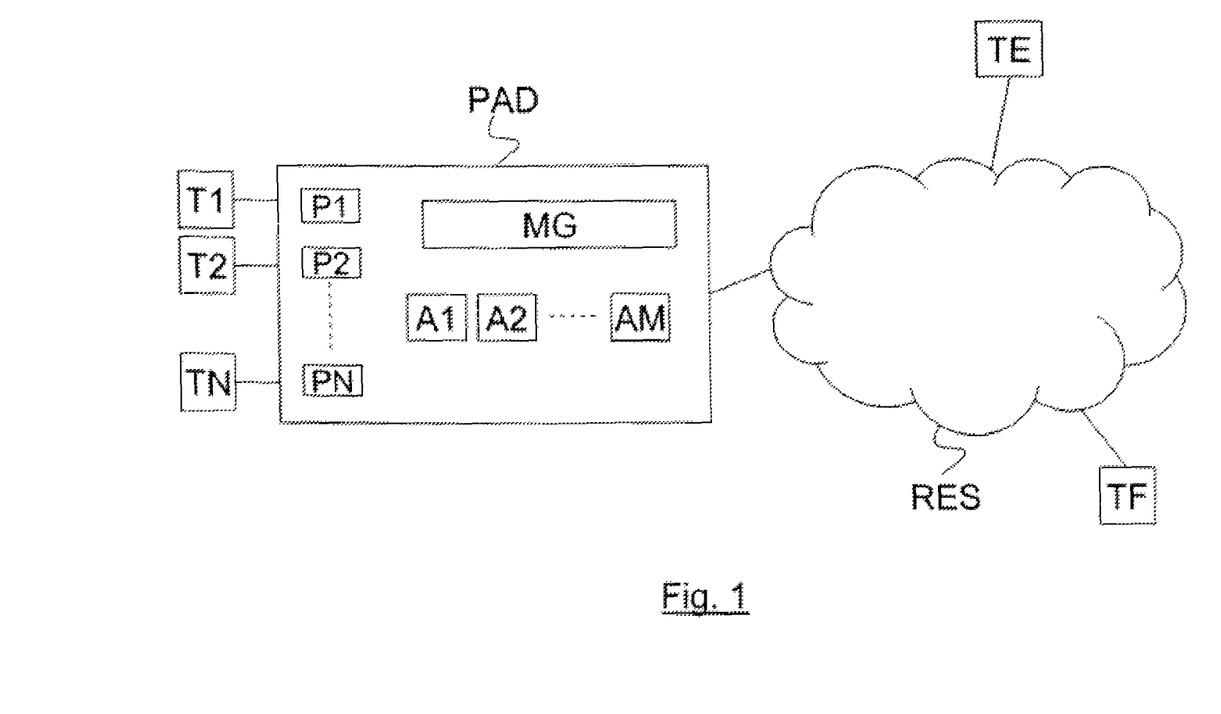
FIG. 1 represents a communication system in which the invention is implemented.

According to a preferred embodiment of the invention represented in FIG. 1, the notification method according to the invention is implemented in a domestic gateway PAD, connected to a voice-over-IP network RES to which two remote telephone terminals TE and TF are connected.

The domestic gateway PAD is equipped with a plurality of connection ports, P1, P2, . . . , PN, to which a plurality of terminals can be connected. In the example envisaged in FIG. 1, terminals T1, T2, . . . , TN are connected respectively to the ports P1, P2, . . . , PN of the domestic gateway PAD.

The ports P1 and P2 are, in this embodiment of the invention, Ethernet ports, the terminals T1 and T2 being terminals dialoguing with the domestic gateway PAD according to the SIP (Session Initiation Protocol) signaling protocol. Obviously, the invention also operates with other types of terminals connected to ports compatible with these terminals. For example, the terminal TN is an analog telephone, connected to the port PN which is an FXS (Foreign eXchange Subscriber) port. The communication protocol used between the terminal TN and the domestic gateway PAD is, in this case, the V.23 protocol, as described in the CCITT recommendation entitled "600/1200 baud modem standardized for use in the general switched telephone network" (1988). Other terminals are, for example, DECT (Digital Enhanced Cordless Telecommunications) terminals connected to the domestic gateway PAD via USB (Universal Serial Bus) ports, or SIP terminals connected to the domestic gateway PAD via WiFi (Wireless Fidelity, according to the standard 802.11 published by the Institute of Electronical and Electronics Engineers (IEEE)) ports.

Furthermore, in this embodiment of the invention, the domestic gateway PAD is a single-line gateway operating in multiple-communication mode. In other words, a number of telephone communications can be managed simultaneously by the domestic gateway PAD. For example, when a first call is set up between the terminal T1 and the terminal TE, the terminal T2 sets up a second call with the terminal TF without releasing the first call in progress. This is possible by virtue of the management by the domestic gateway PAD of as many call state machines A1 to AM as there are terminals involved in simultaneous calls to be managed. These state machines are implemented in software and/or hardware form, and use different communication protocols. For example, if the state machine A1 manages a call involving the terminal T1, it uses the SIP communication protocol and communicates with the terminal T1 via the port P1. Similarly, if the AM state machine manages a call involving the terminal TN, it uses both the V.23 communication protocol to communicate with the terminal TN via the port PN, and the SIP communication protocol to communicate with the network RES.

The domestic gateway PAD differentiates the terminals T1 to TN by as many identifiers local to the gateway, but can be reached from the network RES only by a single telephone identifier. Thus:

an incoming call, that is to say, initiated from the network RES, is signaled by the domestic gateway to all the terminals T1 to TN. The call is then set up with the first of these terminals to answer.

an outgoing call can be initiated without differentiation from any of the terminals T1 to TN connected to the domestic gateway PAD.

Obviously, other embodiments of the invention are possible, in which the domestic gateway PAD is associated with a number of public telephone identifiers, that is to say is multiple-line, or in which the domestic gateway PAD is in single-communication mode.

Finally, the domestic gateway PAD comprises a management module MG, supervising all the state machines A1 to AM and in which the notification method according to the invention is implemented. It should be noted that all the software/hardware modules of the domestic gateway PAD are not represented in FIG. 1, for example the physical network interfacing modules to the network RES.

Figure 2:
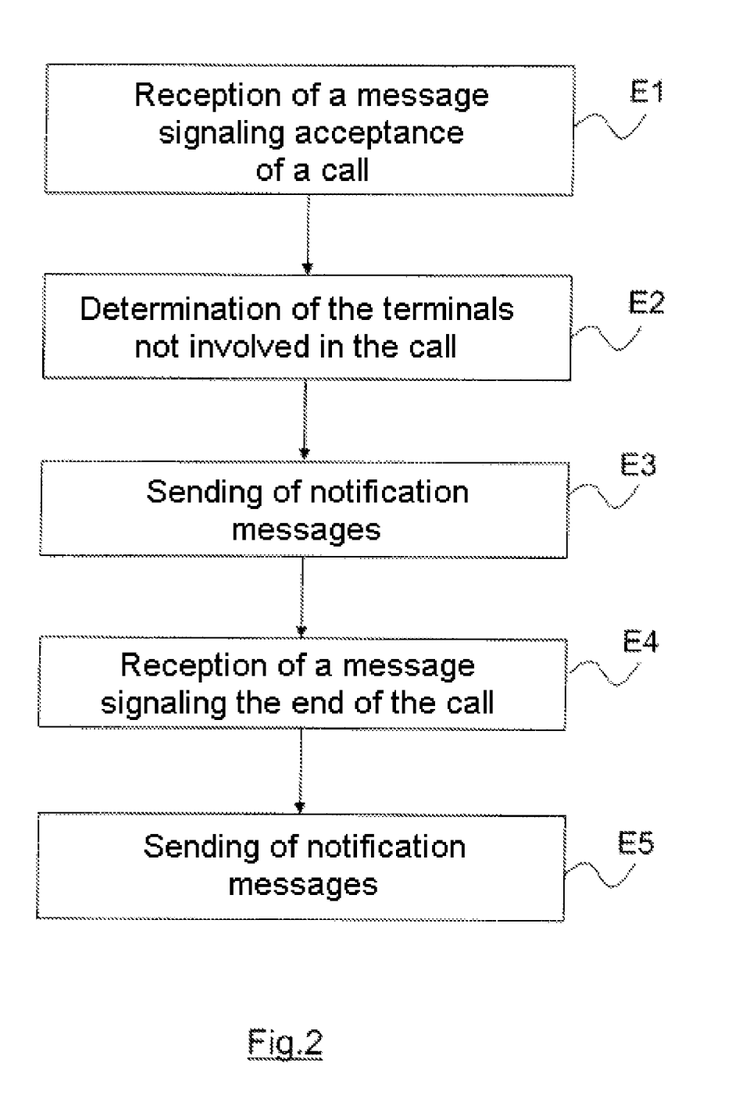
FIG. 2 represents the steps of the notification method according to the invention, in this embodiment of the invention.

With reference to FIG. 2, the notification method according to the invention is now represented in the form of an algorithm comprising steps E1 to E5. The notification method is implemented upon the setting up of a communication passing through the domestic gateway PAD and involving at least one of the terminals T1 to TN, for example only the terminal T1. This communication is a voice-over-IP, mono- or multimedia, call.

The step E1 is the reception of a message signaling acceptance of this call by the domestic gateway PAD, in the setting-up phase of this call. A call context is created and maintained by the domestic gateway PAD in a call state machine throughout the duration of this call. This context stores the parameters linked to this call, notably its state, and the port on which it has been taken, in this case the port P1.

The following step E2 is the determination of the terminals not involved in this call. For this, the domestic gateway PAD consults the context of this call, and identifies all the ports not registered in this context. In this example, these are the ports P2 to PN. The gateway deduces therefrom the terminals that are not involved in this call, that is to say, those associated with these ports, namely the terminals T2 to TN.

The following step E3 is the sending of call-in-progress notification messages to the terminals determined in the step E2, by the domestic gateway PAD. The nature of the ports identified in the step E2 enables the domestic gateway PAD to select the signaling protocol to be used to send these messages to the terminals T2 to TN.

Thus, since the port P2 is an Ethernet port, the domestic gateway PAD sends a call-in-progress notification message in SIP format to the terminal T2. This message is an "SIP MESSAGE" message comprising one or more parameter values in its message body.

Similarly, since the port PN is an FXS port, the domestic gateway PAD sends a call-in-progress notification message in a modified V.23 format to the terminal TN. This is because the current V.23 messages addressed to a terminal not involved in a call do not include any indication of the fact that this call is set up. The call-in-progress notification messages sent by the domestic gateway PAD to analog or DECT terminals are therefore proprietary messages, in a V.23 format comprising one or more additional parameters by contrast to the V.23 standard.

The call-in-progress notification messages sent in this step E3 comprise, in one or more parameters:

an indication of the fact that a call is in progress, in a first variant embodiment of the invention in which the terminals T1 to TN themselves manage a counter of the number of calls in progress on the domestic gateway, or the number of calls in progress on the domestic gateway, in a second variant embodiment of the invention in which the terminals simply display the information supplied by the domestic gateway PAD in the call-in-progress notification messages that it sends to them. In this case, this number is possibly 0, to signal that there is no call in progress, and possibly the identity of one or more terminals involved in the call or calls in progress in this step E3, the duration of these calls, their start times, and the nature of these calls, for example whether they are incoming, outgoing, local, mono- or multimedia calls.

It should be noted that, in this embodiment of the invention, the call-in-progress notification messages are sent only to the terminals not involved in the call for which a call acceptance signaling message was received in the step E1. It is therefore assumed, in this embodiment of the invention, that the terminals involved in a call take account of this call when they count the number of calls in progress according to the first variant embodiment of the invention, or when they receive the indication of the number of calls in progress according to the second variant embodiment of the invention. It should also be noted that, in this embodiment, when a terminal involved in a call receives a call-in-progress notification message following the setting up of another call passing through the domestic gateway PAD, the reception of this notification message on this terminal may cause a power line disturbance on the media flow for a few milliseconds if it is connected in FXS mode to the domestic gateway PAD.

However, other embodiments are possible in which the call-in-progress notification messages are sent to all the terminals connected to the domestic gateway PAD, or only to those for which the connection ports are free, that is to say only to the terminals involved in no call. It should be noted that, in the latter case, the notification messages do not provoke any power line disturbances on the media flow since the terminals receiving these messages have no call in progress. In addition, also in the latter case, it should be noted that only the second variant embodiment, in which the notification messages comprise the number of calls in progress, operate correctly in multiple-communication mode. This is because, in the latter case, the terminals involved in a call are not notified that another call is being set up, and because of this cannot themselves keep the exact count of the number of calls in progress passing through the domestic gateway PAD. It should therefore be noted that, in the latter case, only the free terminals have reliable information concerning the number of calls in progress. This nevertheless does enable a user wanting to make a call from a free terminal to know whether this call is possible.

The following step E4 is the reception by the domestic gateway PAD of a signaling message indicating the end of the call for which a call acceptance signaling message was received in the step E1.

It should be noted that this step E4 does not generally immediately follow the step E3. If events linked to other calls have occurred between the step E3 and the step E4, the latter is therefore possibly preceded by the sending by the domestic gateway PAD of notification messages triggered by these events. These notification messages indicate, for example, that a new call is in progress, or that a previous call which was in progress has just been released.

Finally, the following step E5, triggered by the step E4, is the sending of notification messages by the domestic gateway PAD to the terminals T2 to TN, signaling the end of the call for which the setting up had been notified to them in the step E3. As in the step E3, the communication protocol used by the domestic gateway PAD to send one of these messages depends on the type of port to which the terminal that is the recipient of this message is connected. Thus, the notification message signaling the end of the call sent to the terminal T2 is an "SIP MESSAGE" message, whereas the notification message signaling the end of the call sent to the terminal TN is a message in modified V.23 format. Furthermore, the notification messages sent in this step E5 indicate:

- an indication of the fact that the call has been released, in a first variant embodiment of the invention in which the terminals T1 to TN themselves manage a counter of the number of calls in progress on the domestic gateway,
- or the new number of calls in progress on the domestic gateway PAD, in a second variant embodiment of the invention in which the terminals simply display the information supplied by the domestic gateway PAD in the notification messages that it sends to them. In this case, this number is possibly 0, to signal that there is no longer any call in progress,
- and possibly the identity of one or more terminals involved in the call or calls that are still in progress, the duration of these calls, their start times, and the nature of these calls, for example whether they are incoming, outgoing, local, single- or multimedia calls.

Figure 3:
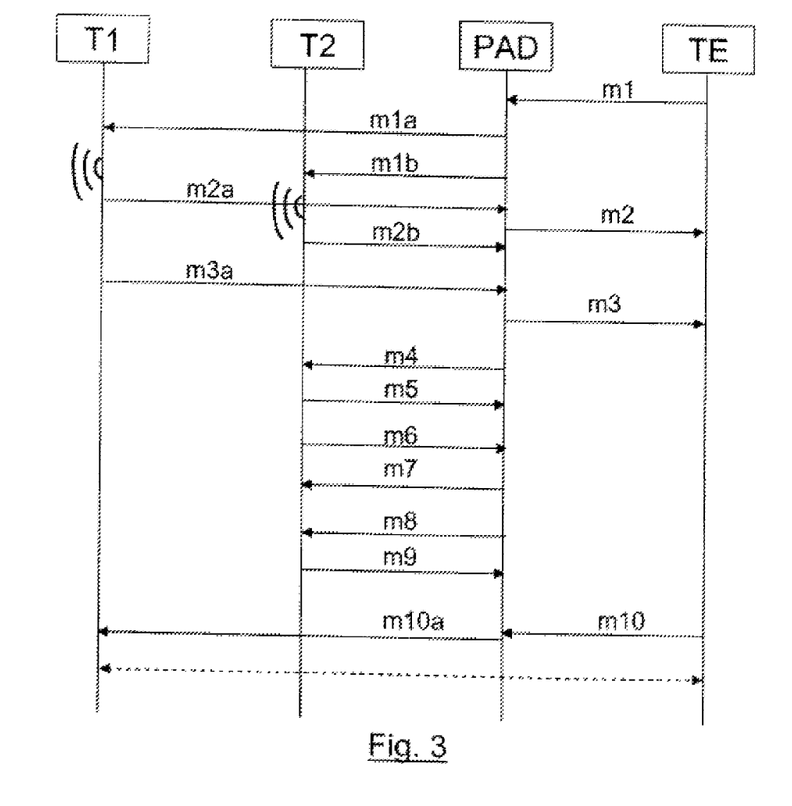
FIG. 3 represents a flow diagram illustrating a use of the notification method according to the invention.

There now follows a description, in relation to FIG. 3, of an exemplary use of the invention in the case of an incoming call, initiated by the remote terminal TE. For simplicity, it is assumed here that the remote terminal TE is a terminal supporting the SIP protocol, and that only the terminals T1 and T2 are connected to the domestic gateway PAD.

The composition, on the remote terminal TE, of the telephone identifier associated with the domestic gateway PAD, triggers the sending by the remote terminal TE of an "SIP Invite" message m1 comprising this identifier, in the network RES, which routes it to the domestic gateway PAD.

On receipt of the message m1, the domestic gateway PAD sends, in parallel, two "SIP Invite" messages m1a and m1b to the terminals T1 and T2 to notify them of this incoming call.

It should be noted that the domestic gateway PAD:
- replaces, before transmitting a message received from the network RES to a terminal connected to a port, the public telephone identifier associated with the domestic gateway PAD in this message with a local telephone identifier associated with this port,
- and replaces, before transmitting to the network RES a message received from a terminal connected to a port, the local telephone identifier associated with this port in this message with the public identifier associated with the domestic gateway PAD.

Thus, for example, the messages m1a and m1b differ from the message m1 by the fact that the message m1a comprises a local telephone identifier associated with the port P1 and the message m1b comprises a local telephone identifier associated with the port P2.

When the respective terminals T1 and T2 respectively receive the messages m1a and m1b, they notify the user and respectively transmit messages m2a and m2b, which are ringing tone "SIP 180 Ringing" messages comprising, as source addresses, the local identifiers of the respective terminals T1 and T2, to the domestic gateway PAD. The domestic gateway retransmits these messages in the form of a single ringing tone "SIP 180 Ringing" message m2, comprising the public identifier of the gateway as source address, to the terminal T2.

It is now assumed that a user opens the line on the terminal T1. The latter then sends an "SIP 200 OK" message m3a to the domestic gateway PAD. On receiving this message m3a, the domestic gateway PAD transmits this message to the terminal TE, which corresponds to the message m3, then stops the ringing of the terminal T2 by sending it an "SIP CANCEL" message m4. The terminal T2 responds positively to this message by sending an "SIP 200 OK" message m5 to the domestic gateway PAD, then an "SIP 487 Request terminated" message m6, that the domestic gateway PAD acknowledges with an "SIP ACK" message m7 sent to the terminal T2.

Since the message m3a is an incoming call acceptance signaling message, its reception forms part of the step E1 of the notification method according to the invention. In parallel, or after the message interchanges described above, following the reception of the message m3a, the domestic gateway PAD therefore determines the terminals not involved in this call, which are connected to the domestic gateway PAD, according to the step E2 of the notification method according to the invention. In this example of use of the invention, only the ports P1 and P2 are activated and there is a call context associated with the port P1. The domestic gateway PAD therefore determines that only the terminal T2 has to be notified that a communication is in progress on another terminal connected to the gateway.

For this, according to the step E3 of the notification method according to the invention, the domestic gateway PAD sends a call-in-progress notification "SIP INFO" message m8 to the terminal T2. On reception of the message m8, the terminal T2 responds positively to it by sending an "SIP 200 OK" message m9 to the domestic gateway PAD, then visually signals that a call is in progress passing through the domestic gateway PAD. This signaling is done, for example, by displaying a text on a screen of the terminal or by lighting a light-emitting diode, or by making it blink. According to the variant embodiments of the invention, either the terminal T2 uses the information contained in the message m8 in order to itself count the number of calls in progress, or this number is directly contained in the message m8. In this example of use of the invention, with a single call being in progress, the terminal T2 displays, for example, "1 call in progress" on a display screen.

In parallel, or prior to these steps E1 to E3, the domestic gateway PAD receives an "SIP ACK" message m10 acknowledging the message m3 on behalf of the terminal TE and transmits it to the terminal T1, which corresponds to the message m10a in FIG. 3. On reception of this message by the terminal T1, a communication is set up between the terminal T1 and the terminal TE.

When one of the users of the terminals T1 or TE hangs up, the steps E4 and E5 of the notification method are implemented. The implementation of these steps in an example of use of the invention is detailed below in relation to FIG. 4.

Figure 4:
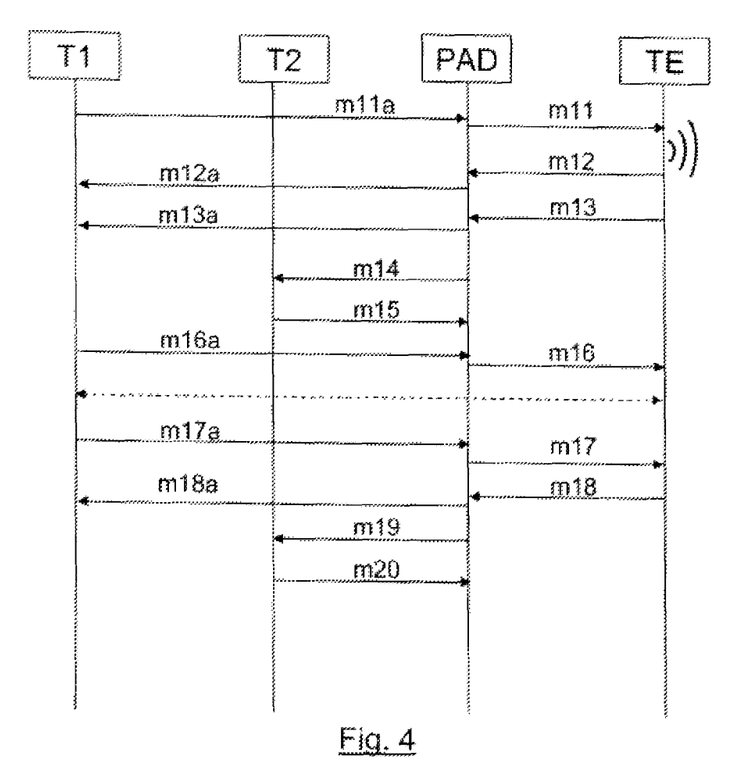
FIG. 4 represents a flow diagram illustrating another use of the notification method according to the invention.

There now follows a description, in relation to FIG. 4, of another example of use of the invention in the case of an outgoing call, initiated by the terminal T1. As in the example of use of the invention described in relation to FIG. 3, it is assumed, for simplicity, that the remote terminal TE is a terminal supporting the SIP protocol, and that only the terminals T1 and T2 are connected to the domestic gateway PAD.

The dialing, on the terminal T1, of a telephone identifier associated with the terminal TE, triggers the sending by the terminal T1 of an "SIP Invite" message m11a comprising this identifier, to the domestic gateway PAD, which transmits it via the network RES to the terminal TE, which corresponds to the message m11 in FIG. 4.

The message m11 is intercepted in the network RES by an IMS platform which authenticates the domestic gateway PAD before transmitting the message m11 to the terminal TE. The interchanges between the domestic gateway PAD and the IMS platform during this authentication are not represented in FIG. 4.

On reception of the message m11, the terminal TE rings, and in parallel sends a ringing tone "SIP 180 Ringing" message m12 to the domestic gateway PAD, which transmits it to the terminal T1, which corresponds to the message m12a in FIG. 4. It is assumed here that a user of the terminal TE answers the call, which provokes the sending by the terminal TE of an "SIP 200 OK" message m13 to the domestic gateway PAD, which transmits it to the terminal T1, which corresponds to the message m13a.

The "SIP 200 OK" message m13 is a call acceptance signaling message. Its reception by the domestic gateway PAD therefore takes place according to the step E1 of the notification method according to the invention. The domestic gateway PAD then determines the terminals not involved in this call, which are connected to the domestic gateway PAD, according to the step E2 of the notification method according to the invention. In this example of use of the invention, only the ports P1 and P2 are activated and there is a call context associated with the port P1. The domestic gateway PAD therefore determines that only the terminal T2 has to be notified that a communication is in progress on another terminal connected to the gateway.

For this, according to the step E3 of the notification method according to the invention, the domestic gateway PAD sends a call-in-progress notification "SIP INFO" message m14 to the terminal T2. On reception of the message m14, the terminal T2 responds positively to it by sending an "SIP 200 OK" message m15 to the domestic gateway PAD, then visually signals that a call is in progress passing through the domestic gateway PAD. In this example of use of the invention, with a single call being in progress, the terminal T2 displays, for example, "one outgoing call in progress" on a display screen.

In parallel, or prior to these steps E1 to E3, the domestic gateway PAD receives an "SIP ACK" message m16a acknowledging the message m13 on behalf of the terminal T1, and transmits this acknowledgement to the terminal TE, which corresponds to the message m16. On reception of the message m16 by the terminal TE, a communication is set up between the terminal T1 and the terminal TE.

It is now assumed that the user of the terminal T1 hangs up. This provokes the sending, by the terminal T1, of an "SIP BYE" message m17a to the domestic gateway PAD, which transmits it to the terminal TE, this transmission corresponding to the message m17. The terminal TE responds positively to this message m17 with an "SIP 200 OK" message m18 sent to the domestic gateway PAD, which transmits it to the terminal T1, which corresponds to the message m18a.

Since the "SIP BYE" message m17a is an end-of-call signaling message, its reception by the domestic gateway PAD takes place according to the step E4 of the notification method according to the invention. In parallel, or after the processing of the signaling messages associated with the end of the call and described previously, the domestic gateway PAD implements the step E5 of the notification method according to the invention.

For this, the domestic gateway PAD sends to the terminal T2, not involved in the communication which has just been released, an "SIP INFO" message m19 comprising an end-of-call indication. The terminal T2 responds positively to this message with an "SIP 200 OK" message m20 and clears the text displayed previously on reception of the message m14 from its display screen. Possibly, it displays instead another text indicating that no call passing through the domestic gateway PAD is in progress.

These examples of use of the invention are not limiting. In practice, the invention also works for local calls between terminals connected to the domestic gateway PAD and passing through this gateway. Furthermore, the steps E1 to E5 of the notification method according to the invention do not necessarily strictly follow one another, other steps being able to be inserted between them, for example if several communications are set up simultaneously.

The invention claimed is:

1. A method for notifying a call involving a terminal connected to a domestic gateway, the setting up of said call involving the passage of a signaling flow through said domestic gateway, said domestic gateway being able to manage simultaneously multiple calls, said method comprising a step of receiving a message signaling acceptance of said call, comprising:
   a step of determining, by said domestic gateway, at least one terminal connected to said domestic gateway and not being involved in any call managed by said domestic gateway;
   and a step of sending a call-in-progress notification message only to said at least one terminal determined not to be involved in any call managed by said domestic gateway.

2. The method as claimed in claim 1, wherein said sending step is followed by a step of receiving a message signaling the end of said call, and a step of sending an end-of-call notification message to said at least one terminal.

3. The method as claimed in claim 1, wherein said sending step is followed by a step of receiving a message signaling the end of said call, and a step of sending a new call-in-progress notification message, said call-in-progress notification messages indicating the total number of calls in progress passing through said gateway to said at least one terminal.

4. The method as claimed in claim 1, wherein said call-in-progress notification message indicates one or more identities of terminals or of users involved in said call or calls in progress.

5. A domestic gateway able to manage simultaneously multiple calls and comprising means for connecting to a communication network, means for connecting to a plurality of communication devices, and means for receiving a message signaling acceptance of a call involving a device of said plurality of devices, said call involving the passage of a signaling flow in said domestic gateway, also comprising:
   means for determining at least one device connected to said domestic gateway and not being involved in any call managed by said domestic gateway;
   and means for sending a call-in-progress notification message only to said at least one device determined not to be involved in any call managed by said domestic gateway.

6. A telephone terminal, comprising:
   means for receiving a notification message sent according to the notification method as claimed in claim 1,
   and means for displaying information indicating that one or more calls are in progress.

7. A telephone terminal, comprising:
   means for receiving a notification message sent according to the notification method as claimed in claim 1,
   means for incrementing a counter of a number of calls in progress on reception of a message notifying a call in progress,
   means for decrementing said counter on reception of a message notifying the end of a call,
   and means for displaying information indicating said number of calls in progress.

8. A non-transitory computer readable medium comprising instructions for implementing the method as claimed in claim 1, when it is run on a computer.

9. The method as claimed in claim 1, wherein said call-in-progress notification message indicates the number of calls in-progress passing through said gateway.

10. The method as claimed in claim 1, wherein said step of determining comprises a step of identifying all the ports not registered in a context associated with said call by the domestic gateway.

* * * * *